United States Patent
Settje et al.

(10) Patent No.: US 7,092,184 B2
(45) Date of Patent: Aug. 15, 2006

(54) MONITORING A SENSOR'S OUTPUT USING A TARGET WINDOW THAT IS BASED ON A LONGITUDINAL OFFSET'S POSITION-DEPENDENT INDICATOR

(75) Inventors: Christopher Thomas Settje, Westminster, CO (US); David Louis Schell, Ft. Collins, CO (US); Steven Alan Koldewyn, Berthoud, CA (US); Reed Hanson, Chaska, MN (US); Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 237 days.

(21) Appl. No.: 10/413,828

(22) Filed: Apr. 15, 2003

(65) Prior Publication Data

US 2004/0021972 A1    Feb. 5, 2004

Related U.S. Application Data (60) Provisional application No. 60/423,779, filed on Nov. 5, 2002, provisional application No. 60/401,100, filed on Aug. 5, 2002.

(51) Int. Cl.
G11B 5/09 (2006.01)
(52) U.S. Cl. .................. 360/51; 360/75; 360/77.04; 360/77.05; 360/73.02
(58) Field of Classification Search .................. 360/48, 360/51, 75, 76, 77.04, 77.05, 77.08
See application file for complete search history.

(56) References Cited

U.S. PATENT DOCUMENTS

| | | | |
|---|---|---|---|
| 4,807,063 A * | 2/1989 | Moteki ................. 360/77.07 |
| 4,937,693 A | 6/1990 | Connolly et al. |
| 5,182,682 A | 1/1993 | Weispfenning et al. |
| 5,570,332 A * | 10/1996 | Heath et al. ............... 369/30.1 |
| 5,796,540 A * | 8/1998 | Jones et al. ............. 360/73.02 |
| 5,805,370 A | 9/1998 | Lee |
| 5,886,846 A * | 3/1999 | Pham et al. ............. 360/78.04 |
| 5,907,448 A * | 5/1999 | Watanabe et al. ........ 360/77.04 |
| 6,067,206 A * | 5/2000 | Hull et al. ............... 360/77.08 |
| 6,188,537 B1 * | 2/2001 | Eland et al. .................. 360/75 |
| 6,208,480 B1 * | 3/2001 | Tigner ......................... 360/63 |
| 6,266,205 B1 * | 7/2001 | Schreck et al. .......... 360/77.06 |
| 6,297,926 B1 * | 10/2001 | Ahn ......................... 360/77.04 |
| 6,320,718 B1 * | 11/2001 | Bouwkamp et al. ..... 360/77.04 |
| 6,388,413 B1 * | 5/2002 | Ng et al. ..................... 318/560 |
| 6,493,171 B1 * | 12/2002 | Enokida et al. ............... 360/75 |
| 6,515,813 B1 * | 2/2003 | Kitazaki et al. .............. 360/51 |
| 6,687,069 B1 * | 2/2004 | Chainer et al. ............... 360/51 |
| 6,710,957 B1 * | 3/2004 | Nakasato ..................... 360/51 |
| 6,775,090 B1 * | 8/2004 | DuLaney et al. ........ 360/77.02 |
| 6,882,487 B1 * | 4/2005 | Hanson et al. ............... 360/51 |
| 2002/0141347 A1 * | 10/2002 | Harp et al. ................. 370/248 |
| 2003/0007276 A1 * | 1/2003 | Satoh .......................... 360/63 |
| 2003/0044091 A1 | 3/2003 | Swanson et al. |
| 2003/0057941 A1 | 3/2003 | Collier-Hallman et al. |

* cited by examiner

*Primary Examiner*—Wayne Young
*Assistant Examiner*—Dismery Mercedes
(74) *Attorney, Agent, or Firm*—David K. Lucente; Derek J. Berger (57) ABSTRACT

Using a "reference" sensor, a reference position is detected in a frame of reference that is moving along a predetermined path relative to the reference sensor. The reference position is used to derive a position-dependent indicator of a position-dependent "longitudinal" offset component (i.e. along the path). An output from the target sensor is monitored using a "target window" that is partially based on the position-dependent indicator.

29 Claims, 7 Drawing Sheets

| | 801 | 802 | 803 | 809 | 807 | 800 |
|---|---|---|---|---|---|---|
| | 0 | 0 | 00 | ... 1D ... | 29 | |
| 851 → | 1 | 0 | 00 | ... 0F ... | 16 | |
| 852 → | 2 | 1 | 16 | ... 26 ... | 35 | |
| | 3 | 1 | 16 | ... 1C ... | 28 | |
| | 4 | 2 | 27 | ... 05 ... | 07 | |
| | 5 | 2 | 27 | ... 19 ... | 24 | |

Fig. 9

| | 901 | 902 | | 905 | 906 | 907 | 900 |
|---|---|---|---|---|---|---|---|
| 914 → | 1 | 3 | ... | 14C | 19B | 1E7 | 235 | 283 |
| | 1 | 4 | ... | 14C | 199 | 1E6 | 233 | 282 |
| | ... | ... | ... | ... | ... | ... | ... |
| | 2 | 4 | ... | 136 | 183 | 1CE | 219 | 266 |
| 924 → | 2 | 5 | ... | 137 | 184 | 1CF | 21A | 265 |

MONITORING A SENSOR'S OUTPUT USING A TARGET WINDOW THAT IS BASED ON A LONGITUDINAL OFFSET'S POSITION-DEPENDENT INDICATOR

CROSS-REFERENCE TO RELATED APPLICATIONS

This application claims the benefit of U.S. provisional application Ser. No. 60/401,100 filed Aug. 5, 2002, titled "Compensation for Head-to-Head Timing Variation Arising in Multi-Disc Drives Having Prewritten Media," and of U.S. provisional application Ser. No. 60/423,779, filed Nov. 5, 2002, titled "Radius Dependent Head Switch Compensation for Prewritten Servo Media."

FIELD OF THE INVENTION

This application relates generally to positional monitoring systems, and more particularly to systems in which data from one or more sensors is used to influence the use of another sensor's output.

BACKGROUND OF THE INVENTION

A variety of applications exist in which two or more sensors are used in one control or monitoring system. Typically, each of the sensors is monitored in parallel. In certain critical applications, for example, two or more mutually redundant sensors monitor the same target simultaneously. A selector is used to determine which of the their outputs is deemed most reliable, and the selected output is used for system control.

In other applications, an array of sensors is used to obtain a comparative or other composite measurement from which an inference can be drawn. By averaging measurements from such an array, for example, one can determine an areal average of a statistic of interest such as height or magnetic flux density. By comparing sensor outputs, also, one can also determine which sensor is nearest or best aligned with a feature of interest.

Recently, certain applications have arisen in which access to a sensor (or its data path) is scarce. This may be the case where data bandwidth, component life, or available energy is limited. Although time multiplexing is generally available as a means for sharing a resource, its application to sensors has thus far been limited to contexts with exceedingly simple geometries. Accordingly there is a need for more a more versatile way to use sensors efficiently, on an intermittent basis.

SUMMARY OF THE INVENTION

Against this backdrop the present invention has been developed. It is a method or apparatus able to generate a timing or positional window for use in monitoring a "target" sensor's output based on one or more positions detected by a "reference" sensor. A priori information about positions detectable by at least one of the sensors is known approximately, relative to a common frame of reference.

In one embodiment of the present invention, an apparatus includes a reference sensor, a target sensor, and a processor. The reference sensor is constructed and arranged to sense a reference position in a frame of reference moving (along a given path) relative to the reference sensor. The processor is constructed and arranged to compute a position-dependent indicator of a position-dependent longitudinal offset component (along the given path) so that the indicator is partially based on the sensed reference position. The processor is able to monitor the target sensor's output using a "target window" partially based on the position-dependent indicator.

In a first alternative embodiment, the apparatus is a data handling system that includes a rotary actuator and disc stack. The actuator rigidly supports the reference and target sensors, which are selectively positionable transducer heads. The disc stack includes one or more disc(s) clamped onto a spindle, the disc(s) having the reference and target positions marked on respective data surfaces. The disc stack defines the frame of reference, traveling along a predetermined path that is nominally shaped like the selected data track.

In a second alternative embodiment, a method includes a step of sensing with a reference sensor a reference position in a frame of reference that is moving along a predetermined path relative to the reference sensor. From this reference position is derived a position-dependent indicator of a position-dependent longitudinal offset component along the predetermined path. A target sensor's output is monitored using a target window partially based on the position-dependent indicator.

In a third alternative embodiment, the "sensing step" is begun by assembling at least the two sensors into a first assembly. At least two rigid elements are both supported in a second assembly that is positioned and in motion relative to the first assembly so that markings on the rigid elements will generally encounter the sensors asynchronously, at random times approximately characterized in an a priori model. The a priori model is used with the detected reference markings to determine the target window used for monitoring the target sensor's output.

In a fourth alternative embodiment, the two assemblies are installed into a disc drive after the markings are on the discs (rigid elements). The above-mentioned position-dependent longitudinal offset component is a "sensor-to-sensor" offset. In addition to this, the target window is further based on a "target-to-reference offset" and a "single-sensor" offset. All three of these offsets are position-dependent longitudinal components determined based on the detected reference position.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of basic engineering and of positioning technologies that are not a part of the present invention (or are well known in the art) are omitted for brevity, avoiding needless distractions from the essence of the present invention. For example, this document does not articulate how arithmetic formulas are formed or solved from a timetable showing known offsets and desired values. Neither does it include implementation decisions such as whether general purpose processors or applications-specific circuitry implements a formula most effectively. Specific techniques for constructing data handling systems are likewise omitted, typically being a matter of design choice to those of ordinary skill in that field of technology.

Definitions and clarifications of certain terms are provided in conjunction with the descriptions below, all consistent with common usage in the art but some described with greater specificity. An "offset" is a positionless scalar quantity, although an offset between two items in motion relative to one another may vary according to their respective positions. A "reference position" is one that is known by virtue of a detection by a "reference sensor," typically a recent detection. "Longitudinal" refers to alignment with (or opposite) a direction of motion of a frame of reference relative to a reference sensor. A "target" is a sought item with a position that is generally predictable by a calculation based on the time(s) of (reference) detection and an estimated relative velocity. A "target sensor" is one constructed and arranged to detect the target, and a "target window" is one that is derived especially for use with a target sensor's output.

A "pure indicator" is an ordinary (signed) scalar number expressible in degrees, microseconds, nanometers, or similar units. More broadly, an "indicator" may also be a multi-element vector having components from which it is possible to derive a scalar indicative of an offset's longitudinal component. One of ordinary skill will be able to incorporate and optimize sensors and circuitry implementing the present invention, in light of the teachings below.

Figure 1:
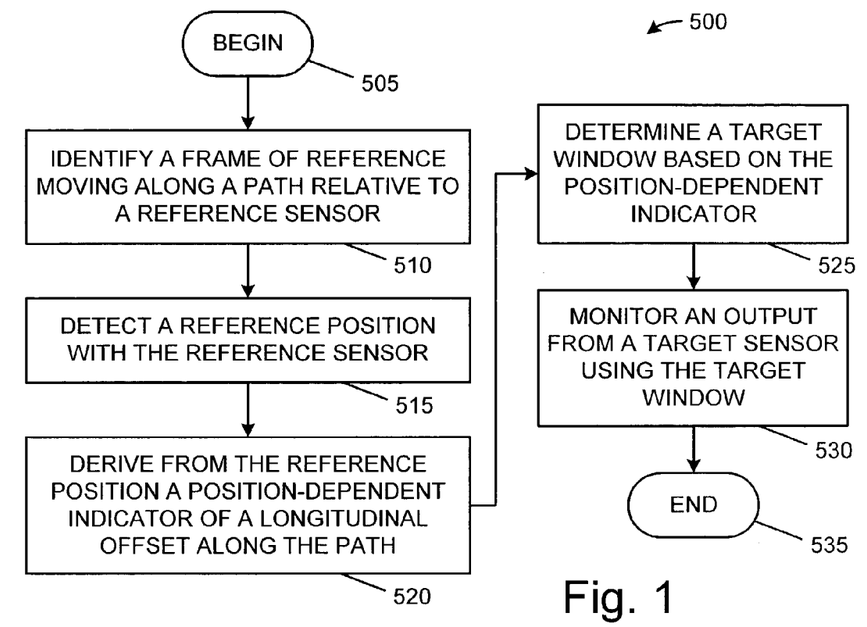
FIG. 1 shows a method embodiment of the present invention in flowchart form.

FIG. 1 shows a method embodiment 500 of the present invention including steps 505 through 535. A frame of reference is identified 510, moving along a path relative to a reference sensor. The sensor detects a reference position 515 that describes the frame's location along its path. For a well understood movement path, a reference position can have as few as one coordinate, which can optionally be expressed in units of length. Alternatively, the reference position on a path can be expressed in other units such as radians or microseconds. Using an a priori model of a position-dependent longitudinal offset (along the path), as exemplified below, an offset indicator is derived 520 from the reference position(s) detected in step 515. Note that the a priori model is optionally expressed as a lookup table, a formula, a program, a circuit, or a hybrid. Once the position-dependent offset indicator is determined, a target window is derived from it 525 that is then used to monitor an output from a target sensor 530.

Figure 2:
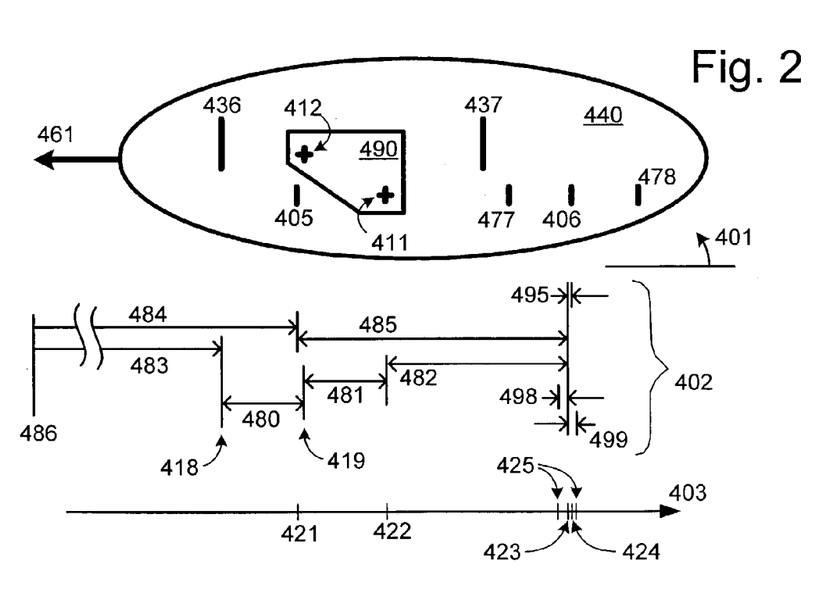
FIG. 2 shows a timeline and several useful offsets relating to a simple physical system upon which the method of FIG. 1 can be performed.

FIG. 2 shows a timeline 403 and several useful offsets 402 relating to a simple physical system 401 upon which method 500 can be performed. Horizontal distances in FIG. 2 (other than line widths) are drawn to scale, whereas vertical distances are schematic. Points and ranges on timeline 403 are specified with reference to a master clock, tracking event times in microseconds. Several offsets 480–485 simultaneously depict distances or angles relative to physical system 401 and time intervals relative to timeline 403.

To perform step 510, frame of reference 440 is identified, moving at a controlled speed along nominally straight path 461 relative to assembly 490, which supports sensors 411, 412. Several detectable positions 405,406,477,478 are positioned so that sensor 411 can detect them but so that sensor 412 cannot. Other detectable positions 436,437 are positioned so that sensor 412 can detect them but so that sensor 411 cannot.

For the present example sensor 411 is designated as a "target" sensor that is being activated. Recent measurements relating to reference frame 440 facilitate this activation, having been received from sensor 412, designated as a "reference" sensor. To perform step 515, sensor 412 detects position 436 (as a reference position) at time 418. The position of (target) sensor 411 is uncertain, relative to the positions 405,406 it did/will encounter. This state of knowledge may exist, for example, if sensor 411 has been deactivated for a long time preceding time 418.

Time 419 indicates the "present position" of reference sensor 412, and offset 480 indicates a just-measured interval since time 418. Time 422 indicates a "present position" of target sensor 411. It should be noted that all of the points on timeline 403 are aligned with positions of target sensor 411. Other times 418,419 relate to the position of reference sensor 412. The skew between times 419,422 and timeline 403 is equal to offset 481. In a preferred embodiment, at least one of the ten last-detected positions (such as 436) is selected for use in step 520.

In reference to step 520, three longitudinal offsets are selected for illustration in this example. The first is designated as a "sensor-to-sensor" longitudinal offset 481. The second is designated as a "target-to-reference" offset like that between positions 405 and 436, indicated in FIG. 2 as a difference between offset 483 and offset 484. The third is designated as a "single sensor" (i.e. "reference-to-reference" or "target-to-target") offset like nominal offset 485 (i.e., an expected distance between positions 405 and 406). Any of these three longitudinal offsets can be crudely modeled as a constant (i.e. independent of position) for simplicity, but all are modeled as position dependent in this example.

To perform step 520, an expected target position 406 is selected that is sufficiently late (i.e. far enough to the right) that an output from sensor 411 can indicate a time 423 when it is detected. Depending on the sensor type, preparing a dormant sensor for use can take 1 to 100 microseconds or longer. If interval 482 is sufficiently long, sensor 411 will be ready in time and able to detect position 406. Optionally, a system of the present invention includes a buffer or delay element (such as 178,278 of FIG. 4) to record or delay target output samples indicative of a time interval of several microseconds, or at least greater than a nominal single-sensor longitudinal offset (such as 485). By using a sufficiently large buffer or delay element, even an already-encountered position (such as 405, encountered at time 421) can be detected in the output of target sensor 411.

Having selected position 406 as the target position to be detected, a target window is determined using one or more of the position-dependent longitudinal offset indicator(s) 481,483,484,485 described above. A "before" margin 498 and an "after" margin 499 are selected as fixed quantities (typically in units like milliradians, microseconds or nanometers) or based on nominal single-sensor longitudinal offset 485. It is desirable that window width (i.e. the sum of margins 498&499) be smaller than 50% of nominal offset 485. More desirably, each of the margins is at most about 0.5% to 5% of offset 485. In an application where other nearby positions 477,478 are detectable by target sensor 411 and can be mistaken for the selected target position 406, such a narrow window is useful for discriminating between a true detection of position 406 and a "false positive" indication.

Generally a target position 406 will be encountered at a measurably different time 424 than its expected time 423, offset by a prediction error 495. Each of the window margins 498,499 is optionally selected to be at least twice as large as a median prediction error based on several previous characterization measurements. Optionally, an initial window is used in monitoring an output for a first target position and where the first target is not detected, a window at least 5% larger is used in monitoring an output for a later-encountered target position.

In any event, a target window (such as 425) is desirably determined as a pair of arithmetic combinations partially based on selected margin(s), the position-dependent longitudinal offset indicator(s), and the time(s) at which the reference sensor(s) detected known position(s). For example, window 425 can be determined effectively from offsets 480,481,483,484,485 as follows: margins 498,499 can be set to (offset 485)/30, and offset 482 can be obtained based on the observation that offsets 480 through 483 have the same sum as offsets 484 and 485.

Figure 3:
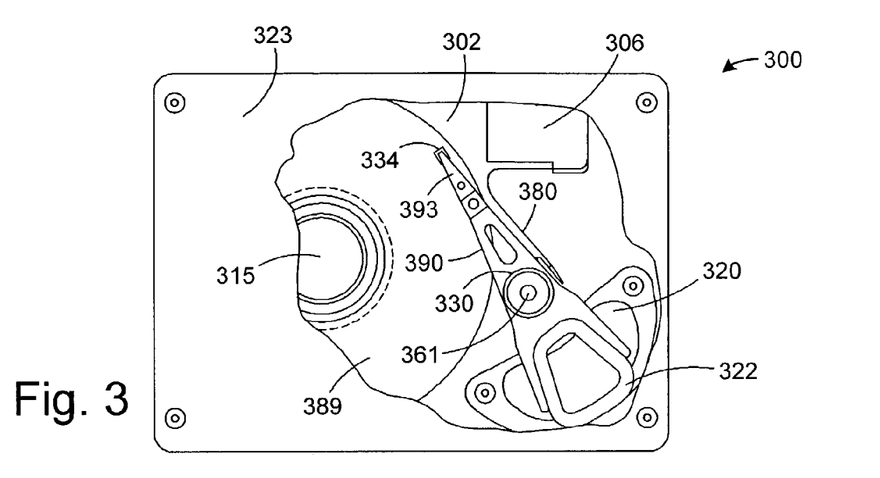
FIG. 3 shows a data handling system constructed in accordance with an embodiment of the present invention.

Turning now to FIG. 3, there is shown a "top view" of a data handling system 300 constructed in accordance with an embodiment of the present invention. (Terms like "top view" are arbitrary here, in that systems like 300 can operate in any orientation.) System 300 includes "top" cover 323 that cooperates with base 302 to form a sealed chamber. Components supported in the chamber include a spindle motor 315 which rotates one or more data storage disc(s) 389 at hundreds or thousands of revolutions per minute. Information is written to and read from data surfaces on disc(s) 389 through the use of an actuator assembly 361, which rotates during a seek operation about a bearing shaft assembly 330. Actuator assembly 361 includes one or more actuator arms 390 which extend above and below each of the disc(s) 389, with one or more flexures 393 extending from each of the actuator arms. Mounted at the distal end of each of the flexures is a sensor 334 on an air-bearing slider enabling sensor 334 to fly in close proximity above the corresponding surface of an associated disc 389.

Servo and user data travels through sensor 334 and flex cable 380 to control circuitry on controller board 306. (Controller board 306 is configured with circuits described below with reference to FIG. 4 to perform the method described above with reference to FIG. 1). Flex cable 380 maintains an electrical connection by flexing as sensors 334 traverse tracks along their respective radial paths. By "radial," it is meant that these paths are substantially aligned with a radius of the disc(s) 389, although their directions may be offset from a perfectly radial direction by up to about 20 degrees due to "horizontal" actuator rotation (skew).

During a seek operation, the overall track position of sensors 334 is controlled through the use of a voice coil motor (VCM), which typically includes a coil 322 fixedly attached to actuator assembly 361, as well as one or more permanent magnets 320 which establish a magnetic field in which coil 322 is immersed. The controlled application of current to coil 322 causes magnetic interaction between permanent magnets 320 and coil 322 so that coil 322 moves. As coil 322 moves, actuator assembly 361 pivots about bearing shaft assembly 330 and sensors 334 are caused to move across the surfaces of the disc(s) 389 between the inner diameter and outer diameter of the disc(s) 389.

Difficulties have arisen in the cost-effective manufacture of data handling systems like that of FIG. 3. Many of the difficulties relate to exceedingly high track pitch and precise timing requirements. For example, servo-writing many thousands of finely-pitched tracks takes a lot longer than servo-writing at lower densities. For this reason some manufacturers are looking to systems for installing pre-written discs into a data handling system. Others are looking to systems for having the data handling system servo-write itself. Both of these techniques can introduce significant offsets between detections of marked positions not previously encountered.

Figure 4:
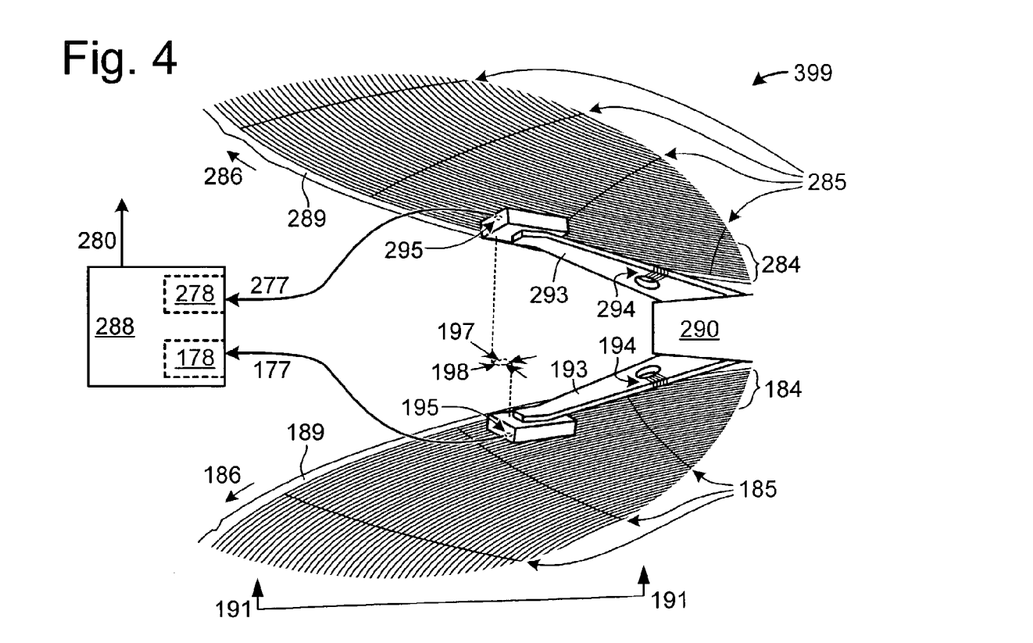
FIG. 4 shows a close-up "side view" from between two discs of a data handling system like that of FIG. 3.

To illustrate this FIG. 4 shows a close-up "side view" from between two discs 189,289 of data handling system 399 (similar to system 300 of FIG. 3). As FIG. 4 shows, rotary actuator arm 290 supports sensors 195,295 each near the outermost extent of its arcuate range, respectively positioned to access outer tracks 184 of disc 189 and/or from outer tracks 284 of disc 289. The pitch between tracks 184,284 is actually exceedingly fine, orders of magnitude denser than those shown. Sensors 195,295 are supported by arm 290 via flexures 193,293, which are respectively equipped with microactuators 194,294. In implementing the present invention, fine control of the position of sensors 195,295 is optionally made with the microactuator(s) 194, 294, provided that timing offsets from the microactuator(s) are sufficiently small and/or well understood.

Offset 198 is one of the offsets of particular concern in this document. It is depicted in a circumferential direction relative to discs 189,289, which rotate on a spindle at a controlled speed about a common axis as shown by respective movement indicators 186,286. Offset 198 shows that sensor 195 leads sensor 295 slightly. Sensor 195 is also closer to the discs' axis of rotation than sensor 295, as indicated by radial offset 197.

Sensor 195 generates an output 177 that is received into buffer 178 of processor 288, which is implemented in control circuitry like that of controller board 306 of FIG. 3. Sensor 295 similarly generates an output 277 that is received into buffer 278. (Sensors 195,295 transmit outputs 177,277 via a preamplifier circuit supported on the actuator, not shown.) In a preferred embodiment, processor 288 generates an indication 280 of whether an item detected by the target sensor is "authentic" (i.e. implementing test step 1265 of FIG. 12).

An important component of sensor outputs 177,277 is position information found in servo wedges 185,285 on respective surfaces. (In FIG. 4, note that servo wedges 185 will not be encountered by sensor 195 at the same time that servo wedges 285 are encountered by sensor 298.) Most or all of the position information that enables sensors 195,295 to stay on their respective tracks is found in marks within the servo wedges. It should be understood that servo "wedges" are so named because they ordinarily taper narrower near the inner tracks of each surface. Also, the wedges are typically not perfectly radial. They each curve in a generally circular arc so that a rotation of actuator arm 390 will not greatly alter the time at which a given servo wedge will be encountered by a corresponding sensor.

Figure 5:
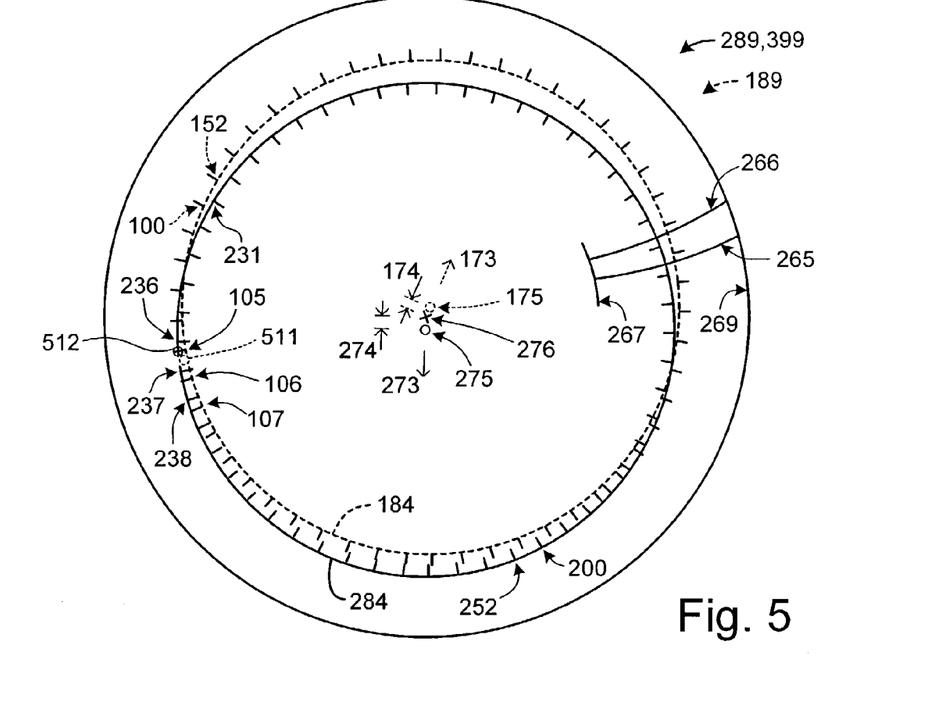
FIG. 5 shows a "bottom view" of selected items in FIG. 4 in the rotating frame of reference of a data storage disc.

This can be seen more easily in FIG. 5, a "bottom view" 191 of selected items in FIG. 4, in the rotating frame of reference of disc 289. Arcuate servo wedges 265,266 are shown to extend between an outer diameter 269 and an inner diameter 267. Sensor 295 follows a nominally circular track 284 near the outer diameter 269, while sensor 195 zigzags along somewhere near an offset circular track 184 of disc 189. Track 284 has a center 275 that is offset from the discs' axis of rotation 276 by an offset 274 in a direction (phase) 273 as shown. Track 184 similarly has a center 175 that is offset from the discs' axis of rotations 276 by an offset 174 in a direction (phase) 173 as shown. Offsets 174,274 are shown atypically large for clarity, but they are small enough that tracks 184,284 are both in annular zone 4. For prewritten discs installed into a data handling system, it is expected that each track-center offset will be at least one to three orders of magnitude greater than a nominal track pitch.

Recalling that FIG. 5 is a view from the discs' frame of reference, it will be understood that sensors 195 & 295 seek or track follow radially as they rotate about the axis of rotation 276. At a selected moment of interest, sensor 195 is in position 511 and sensor 195 has just detected position 105. It is being de-selected, after which it will encounter positions 106 and 107. Sensor 295 is in position 512, lagging and further out as shown in FIG. 4. Sensor 295 has just encountered position 236 without detecting it, is being activated, and is about to encounter (and hopefully detect) positions 237 and 238. Circumferential positions 100 through 152 on disc 189 are all encountered by sensor 195 during its rotation. Circumferential positions 200 through 252 on disc 289 are all encountered by sensor 295 during its rotation. All of these positions 100–152 & 200–252 are wedges that include a physical wedge number that is at least zero and at most 52.

Figure 6:
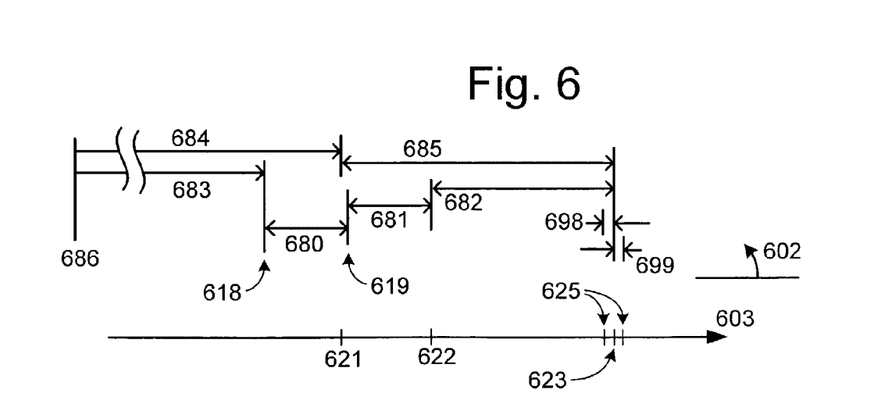
FIG. 6 shows several offsets and a timeline exactly proportional with those of FIG. 2, but reflecting the physical system of FIG. 5.
Figure 7:
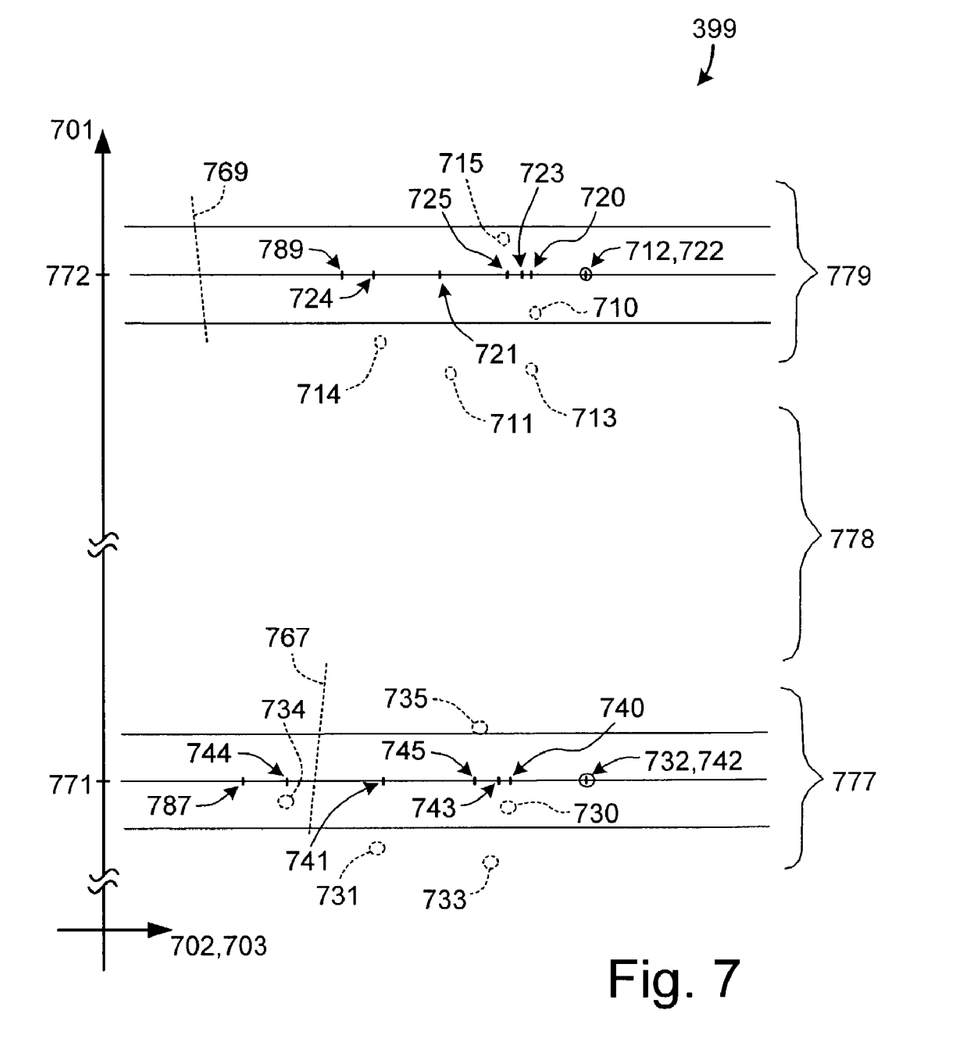
FIG. 7 shows a "bottom view" of the data handling system of FIG. 5 in a polar coordinate system.

FIG. 6 shows offsets 602 and timeline 603 exactly proportional with those of FIG. 2. Times 618,619,621,622,623, 625,686 and offsets 680,681,682,683,684,685,698,699 are exact counterparts of those of FIG. 2, each with reference numbers simply offset by 400. Offset 685 is a nominal servo sample period (between successive servo samples). FIG. 7 shows how sensor-to-sensor offset 685 can be modeled accurately with indicators that vary depending on (detected) position. In a polar-coordinate "bottom view" 191 of data handling system 399, the positions 710,711,712,713,714, 715 of six sensors (having respective identifiers 0 through 5) are shown in a range of tracks 779 near the outer diameter 269. Radial positions 701 at an inner range of tracks 777 and at an outer range of tracks 779 are each plotted versus time 702 (or angle 703). As illustrated by offsets 197,198 of FIG. 4, significant radial and circumferential offsets can exist among any or all of the sensors' positions 710,711,712,713, 714,715. For each of the sensors' positions in this constellation, a corresponding circumferential offset to a crossing position 720,721,722,723,724,725 is known relative to an arbitrary reference position 789. At a given radial position 772 near the outer diameter, skew 769 leans to the left as shown. For this reason, crossing position 725 is skewed to the right relative to its corresponding (constellation) sensor position 715. The other crossing positions 720,721,723,724 are all skewed to the left except 722, which is not skewed relative to its corresponding sensor position 712. Skew 769 is not vertical in FIG. 7 because data handling system 399 uses a rotary actuator, which pivots about an actuator axis (not shown) far to the left of the items shown in FIG. 7.

Suppose the rotary actuator shifts clockwise relative to FIG. 7 so that all six sensors (0 through 5) are in new positions 730,731,732,733,734,735 in an inner range of tracks 777 near the inner diameter. For each of the sensors' positions, a corresponding circumferential offset to a crossing position 740,741,742,743,744,745 is known (i.e. adequately estimated by a model) relative to an arbitrary reference position 787. At a given radial position 771 near the inner diameter, skew 767 leans to the right as shown. The skew 767 and the constellation of positions 730–735 are all rotated clockwise relative to the corresponding skew 769 and constellation of positions 710–715 near the outer diameter.

As one manifestation of this clockwise shift, note that sensor 0 is closer than sensor 4 to the disc center (i.e. lower, on FIG. 7) in inner range 777. This was not the case in outer range 779, at which sensor 0's position 710 is higher than sensor 4's position 714. As another manifestation of the clockwise shift, crossing position 745 is skewed to the left relative to its corresponding sensor position 735. The other crossing positions 740,741,743,744 are skewed to the right all except 742, which is not skewed relative to its corresponding sensor position 732.

Apart from the clockwise shift just described, the "inward seek" across middle range 778 results in another shift that is important for present purposes. Recall that ordinary servo wedges each taper so that they are narrower in inner ranges and wider in outer ranges. Referring again to FIG. 4, it should be noted that sensor-to-sensor longitudinal offsets like 198 will not ordinarily taper narrower (in terms of distance) during an inward seek. Thus when viewed as a function of time 702 or angle 703, the constellation of sensor positions 730–735 will dilate horizontally during an inward seek. This is visible in the plot of FIG. 7 in that the constellation of sensor positions 730–735 is horizontally stretched by more than 20%, relative to the corresponding constellation of sensor positions 710–715 near the outer diameter.

Figure 8:
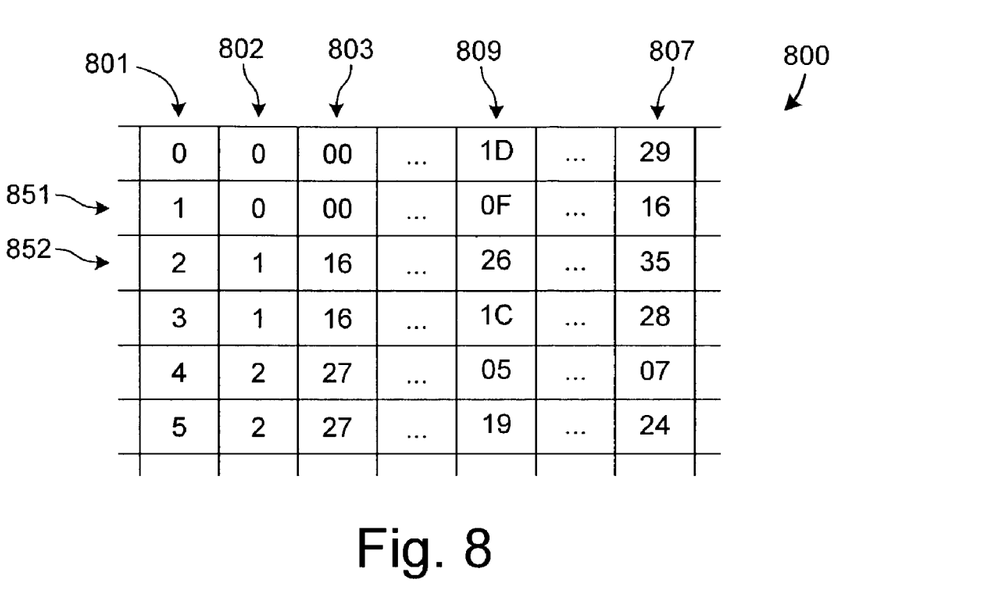
FIG. 8 shows a virtual sector offset model and a model estimating "sensor-to-sensor" longitudinal offsets varying depending on radial position, in the system of FIG. 5.

FIG. 8 shows a virtual sector offset model and a model estimating how "sensor-to-sensor" longitudinal offsets vary as a function of radial position in the physical system of FIG. 5. In table 800, column 801 indicates a sensor number and column 802 indicates a disc number. Column 809 indicates longitudinal offsets (in hexadecimal) of each corresponding sensor number relative to reference position 789 of FIG. 7. Column 807 likewise indicates longitudinal offsets of each corresponding sensor number relative to reference position 787. Rows 851&852 thus provide information relating to sensors 195,295 of FIG. 4.

Table 800 can be used to estimate position-dependent sensor-to-sensor offset 681 of FIG. 6. First, the relevant position is identified. Applying table 800 without interpolation (as a simple zoned system), it is noted that sensor locations 511,512 (at track 284 of FIG. 5) correspond with the outer annular zone characterized in column 809. Suppose that radial position 772 of FIG. 7 corresponds with track 284 of FIG. 5. Sensor-to-sensor offset 681 can thus be determined as "26" hex minus "0F" hex, which is equal to 23 (decimal units of time, distance or rotation). On FIG. 7, this sensor-to-sensor offset 681 corresponds to the horizontal offset between crossing positions 721&722. On FIG. 5, this sensor-to-sensor offset 681 corresponds to the circumferential offset between sensor positions 511&512.

If the actuator is rotated to bring sensors 1 & 2 into inner range 777, the relevant table entries in rows 851&852 will be "35" hex and "16" hex. The difference between these is 31 (decimal units). Thus the indicator of the sensor-to-sensor offset 681 has a smaller magnitude at an outer range 779 than it would at an inner range 777. In this way the indicator of the sensor-to-sensor offset 681 is "position dependent" unlike any such indicators of the prior art.

Column 803 of FIG. 8 implements a "virtual sector index" that effectively provides coarse rotary alignment between discs in software. Referring to FIG. 5, note that disc zero's sector zero (at 100) is nowhere near disc one's sector zero (at 200). Physically aligning pre-written discs during manufacture is burdensome, so it is desirable to be able to compensate in software for such gross rotary misalignment (of 10 degrees or more).

To compute a virtual sector number, the hex value in column 803 is first added to the physical sector number that is read from a corresponding servo wedge. If the resultant sum is not less than 53 (i.e. the number of servo wedges), then that quantity is subtracted from the sum. Using this "modulo N" system, a virtual sector number is thus derived as an integer between 0 and N−1, where N is the number of servo wedges.

As an example, the physical sector number read at position 100 is zero, which is added to the value in row 851 and column 803 of FIG. 8. The sum is zero, the virtual sector number at position 100. The virtual sector number at position 106 is six. Because the table value is "00" hex for disc zero, each of the physical sector numbers readable by sensor 1 are the same as each corresponding virtual sector number.

At position 231, the closest position to disc zero's sector zero, the physical (readable) sector number is 31. This number is added to the value in row 852 and column 803, which is "16" hex. The sum is 31+22=53. This is not less than the number of servo wedges, so that number (53) is subtracted from the sum. The virtual sector number at position 231 is thus zero. In a multi-disc drive made of pre-written discs, it is desirable that such virtual offsets be defined so that two sectors closest to one another (on different discs) have identical virtual sector numbers, even though their readable (physical) sector numbers are different.

Referring again to the three position-dependent indicator above, recall that the second was designated as the "target-to-reference" offset indicator, the longitudinal offset between two positions each accessible by a respective sensor. Recall that an example of this offset was shown in FIG. 2 as the difference between offsets 483 and 484. This is the longitudinal component of the offset between positions 405 and 436, respectively accessible by sensors 411 and 412.

Figure 9:
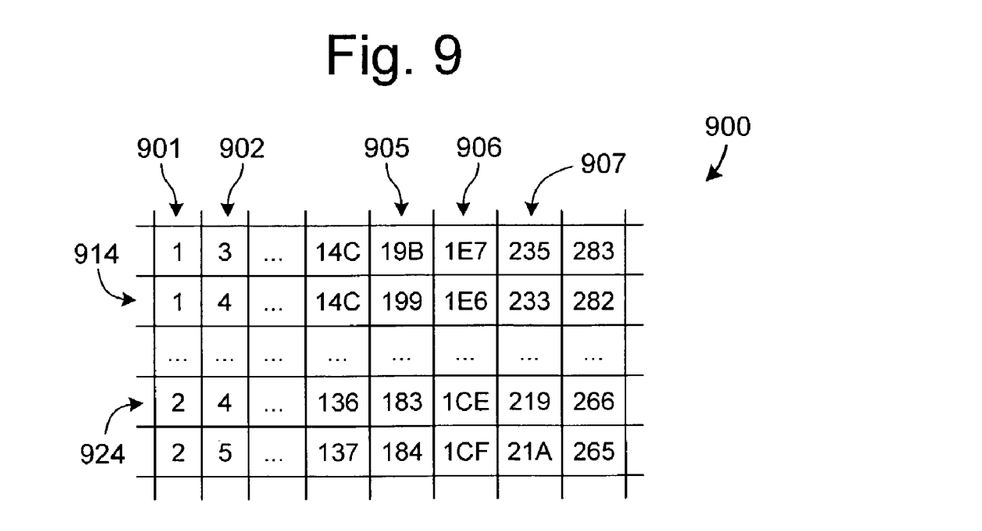
FIG. 9 is a model characterizing how a nominal "single-sensor" longitudinal offset varies depending on radial and circumferential position, in the system of FIG. 5.

FIG. 9 is a model characterizing, among other things, how the nominal so-called "single-sensor" longitudinal offset (e.g. 685 of FIG. 6) varies as a function of radial position (e.g. zone) and circumferential position (e.g. of a virtual sector), in the physical system of FIG. 5. In table 900, column 901 indicates a sensor number. (Sensor number 1 corresponds to sensor 195 of FIG. 4, and sensor number 2 corresponds to sensor 295.) Column 902 indicates annular zone number, an indicator of radial position that increases from the outer diameter 269 to the inner diameter 267. Column 905 corresponds to (virtual) sector 5, i.e. positions 105,236 of FIG. 5. Column 906 corresponds to sector 6, i.e. positions 106,237. Column 907 corresponds to sector 7, i.e. positions 107,238.

Recall that time 618 identifies when reference sensor 295 encountered position 236, before the current position 512 of sensor 295 (at time 619). To determine the time 621 when target sensor 195 did/will encounter position 105, two lookups are performed in table 900. As with table 800, for simplicity and speed, a lookup with no interpolation is assumed. Relevant values are in annular zone 4, rows 914,924. Note that values in table 900 are hexadecimal, defined relative to an arbitrary time 686 of FIG. 6. Offset 684 is in row 914 and column 905, "199" hex. Offset 683 is in row 924, column 905, "183" hex. The difference between these values is 22 (decimal units). The zone 4 decimal difference between similar values at virtual sector 6 is 24 ("1E6" minus "1CE"). The zone 4 decimal difference between similar values at virtual sector 7 is 26 ("233" minus "219"). From this progression from 22 to 24 to 26, it is apparent that the gap between corresponding virtual sectors is widening. This second offset indicator is "position dependent" on radial and/or circumferential position unlike any similar indicators of the prior art.

Recall that the third offset indicator described above was designated as the "single-sensor" offset indicator. It is a local nominal inter-positional longitudinal offset such as 685, the expected circumferential offset between positions 105 and 106. In table 900, this is modeled as the difference between the entries of column 906 and 905 at row 914. It is computed as "1E6" hex minus "199" hex, equal to 77 (decimal units). Note that this offset indicator varies in table 900 as a function of radial position and/or circumferential position, unlike any similar indicators of the prior art.

Optionally, values from a table like that of FIG. 9 are not simply read and used. Rather, the values given in column 902 are each associated with a corresponding tracks, the indicated tracks being uniformly interspersed across the usable data surface. Values for the innermost and outermost tracks are included in the table. For tracks that are not listed, a linear interpolation is made between the offset values of the two nearest ones of the listed tracks. In this way, sharp transitions from measurement errors are avoided in the formation of the model. Given teachings herein one of ordinary skill will readily be able to decide on a linear or otherwise-calibrated interpolation/extrapolation model.

In an alternative embodiment, more complex formulas are used to reduce the volume of data that is stored in lookup tables. For a system like that of FIG. 5, in which the tracks are characterized as off-center circles that are not aligned disc-to-disc, the table of FIG. 9 can be replaced with one that simply lists a phase (like 173,273) and an offset (like 174,274) for each disc. Unfortunately, such formulae are inherently burdensome to convey concisely and implement. For example, the following formula gives same-surface variation around a given track, for a system like that of FIG. 5:

$$T_{modulation}(k, track, h) = \qquad (1)$$

$$A(track, h)\sin\left(\frac{2\pi}{N}k\right) + B(track, h)\cos\left(\frac{2\pi}{N}k\right) + Tnom$$

where
  Tmodulation=mark-to-mark modulation;
  k=sector number;
  h=head (sensor) number;
  track=track number;
  Fs=function applied to the sine term;

Fc=function applied to the cosine term;
Tnom=nominal sample period;

and A and B are coefficients that describe the amplitude and phase variation of the timing modulation. Repeatable timing error (RTE) is defined here and represents only the variation from the nominal sample period.

$$T_{modulation}(k, track, h) = \quad (2)$$
$$Tnom - A(track, h)\sin\left(\frac{2\pi}{N}k\right) + B(track, h)\cos\left(\frac{2\pi}{N}k\right)$$

In one implementation, A and B are derived from the existing repeatable timing error (RTE) coefficients, thus eliminating the need for additional calibration. In brief, the RTE calibration is run on each disk to fully characterize the amplitude and phase of the timing modulation as it varies across the radius. This characterized RTE is then compared against the AM time of the current servo sector and the status of write gate is determined.

Continuing with the derivation, it is noted that the integration of equation 1 leads to an expression that describes the absolute time that elapses from servo sector k=0 to the kth sector. Integrating equation 1 one arrives at $$T_{absolute}(k, track, h) = \quad (3)$$
$$\frac{N}{2\pi}\left[-A(track, h)\cos\left(\frac{2\pi}{N}k\right) + B(track, h)\sin\left(\frac{2\pi}{N}k\right)\right] + k * T_{nom}$$

Equation 3 can be thought of in terms of the integral of the RTE and can be written as $$\int RTE(k, track, h) = \quad (4)$$
$$k * T_{nom} - \frac{N}{2\pi}\left[-A(track, h)\cos\left(\frac{2\pi}{N}k\right) + B(track, h)\sin\left(\frac{2\pi}{N}k\right)\right]$$

The timing skew can then be calculated as $$T_{skew}(k, track, h_d, h_s) = T_{absolute}(k, track, h_d) - T_{absolute}(k, track, h_s) \quad (5)$$

or $$AC_{skew}(k, track, h_d, h_s) = \int RTE(k, track, h_d) - \int RTE(k, track, h_s) \quad (6)$$

where
  Tskew—predicted head skew time
  hd—destination head number
  hs—source head number Ultimately the total timing skew is given by $$Total_{skew}(k, track, h_d, h_s) = AC_{skew}(k, track, h_d, h_s) + DC(track, h_d, h_s) \quad (7)$$

As another example, the following formula gives an offset value that is added to a nominal value to find a timing skew between a reference position and a target position:

$$t_{rel\_od\_cal}(trk) := \left(\frac{\cos(\theta_{rel}(trk))}{r_{nom}(\theta_{track}(trk))} - \frac{\cos(\theta_{rel}(trk_{ref}))}{r_{nom}(\theta_{track}(trk_{ref})))}\right)\frac{delta_{arm}}{spin\_speed}$$

where $t_{rel\_od\_cal}$ represents the relative reference-to-target mark timing shift between two sensors, relative to a nominal value $\theta_{rel}(trk) := \theta_{zero\_skew} - \theta_{track}(0) + \theta_{trk} \cdot trk$ $\theta_{zero\_skew}$ is the angle of the actuator at the zero skew track in radians $\theta_{track}(0)$ is the angle of the actuator at track zero in radians $\theta_{track}$ is the angle of the actuator in radians $\theta_{track}$ is the angle of the actuator in radians $trk_{ref}$ is the reference track that all times will be relative to $r_{nom}$ is the nominal radius for the track in inches $delta_{arm}$ is the difference in actuator arm lengths in inches spin_speed is the spindle speed in radians per second.

Figure 10:
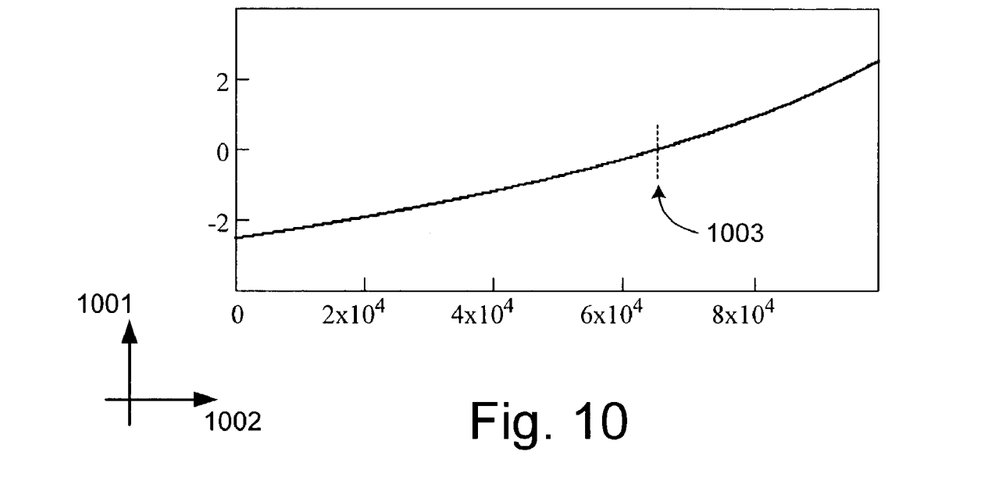
FIG. 10 shows a plot of a calculated timing shift estimate against track number, for a particular disc drive of the present invention.

A plot of this calculated timing shift 1001 (in microseconds) for a particular disc drive is plotted against track number 1002 shown in FIG. 10. Note that the offset values increase near the inner diameter. For some "nominal" track 1003 near the inner diameter, having a track number between 60 and 70 thousand, this offset value is zero.

Figure 11:
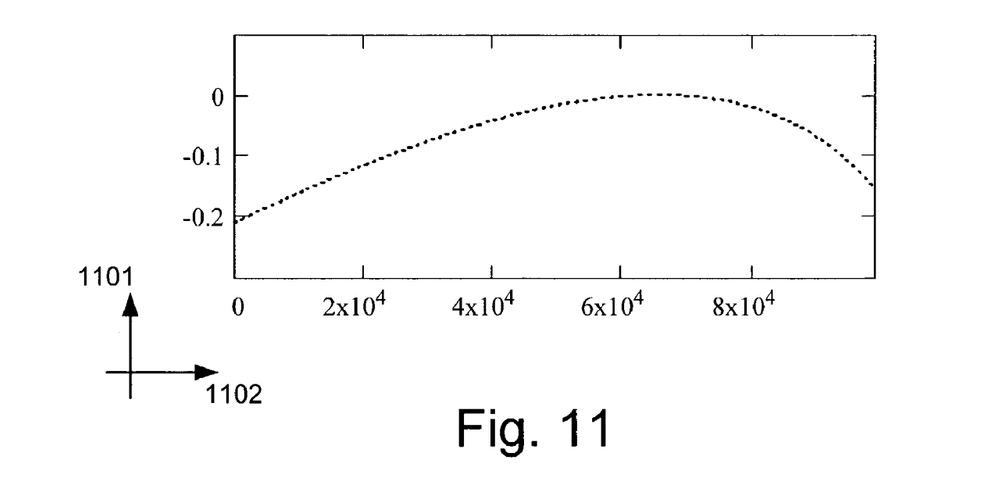
FIG. 11 shows the worst case error in a formula approximating a longitudinal offset indicator.

By measuring the relative time ($t_{a\_b}$) at the OD cal track and at the ID cal track the $delta_{arm}$ length can be calculated.

$$delta_{arm} := spin\_speed \cdot \frac{(t_{a\_b}(\theta_{track}(trk_{cal\_id}), \delta_{arm}) - t_{a\_b}(\theta_{track}(trk_{cal\_od}), \delta_{arm}))}{\left(\frac{\cos(\theta_{zero\_skew} - \theta_{track}(trk_{cal\_id}))}{r(\theta_{track}(trk_{cal\_id}), 0)} - \frac{\cos(\theta_{zero\_skew} - \theta_{track}(trk_{cal\_od}))}{r(\theta_{track}(trk_{cal\_od}), 0)}\right)}$$

where $\delta_{arm}$ refers to a difference in the distances between each sensor and the actuator's axis of rotation. Once the calibration is complete and $delta_{arm}$ is known then the following calculation is executed for each sensor switch.

$$t_{rel\_approx\_1}(trk) := \left(\frac{1}{r_{nom\_1}(\theta_{rel}(trk))} - \frac{1}{r_{nom\_1}(\theta_{rel}(trk_{ref})))}\right)\frac{delta_{arm}}{spin\_speed}$$

where $r_{nom\_1}$ is an approximation of the nominal radius for a given track in inches This equation is a simplified approximation of the above described relative address mark timing shift due to the variation in arm lengths. Using this approximation, the worst case error between the approximation and the actual timing shift is shown in FIG. 11. Worst case error 1101 (in microseconds) is plotted against track number 1102.

Figure 12:
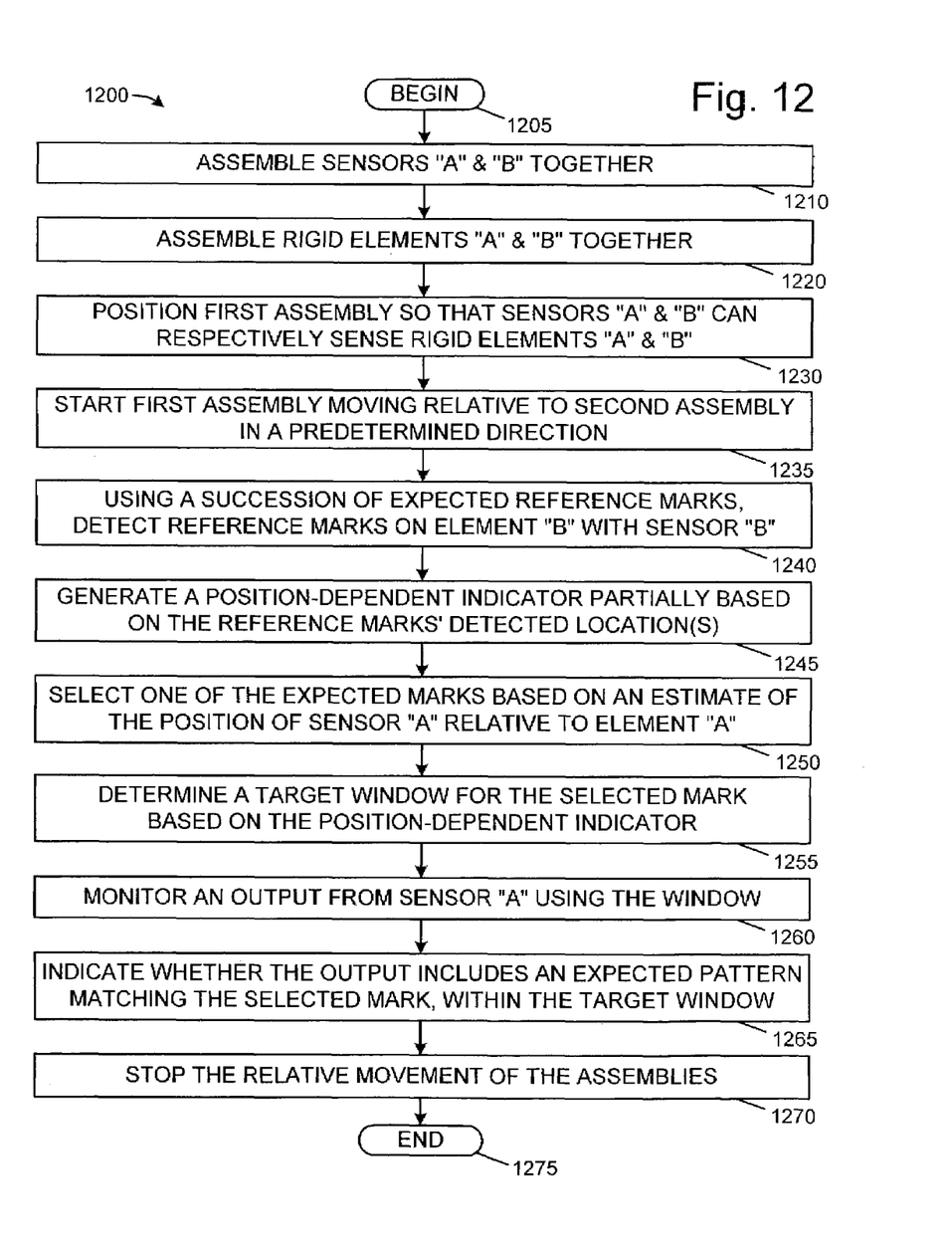
FIG. 12 shows a flowchart illustrating a specific method of the present invention.

FIG. 12 is a specific method 1200 of the present invention comprising steps 1205 through 1275. Sensors are mounted to form a first assembly 1210. A reference and target element are assembled 1220 to form a second. The assemblies are positioned 1230 and set into motion 1235. The reference sensor is used to sense a reference mark 1240, usually by a reference window indicative of a reference mark's expected position. A position-dependent indicator is generated partially based on the detected position(s) 1245. One of the expected (target) positions is selected based on an estimated position of the target sensor relative to the target item 1250. A target window distinct from any reference window is determined for the selected target position based on the position-dependent indicator 1255. The output from the target sensor is monitored using the target window 1260. A signal (such as output 280 of FIG. 4) is generated to indicate whether the output includes an expected pattern matching the selected position, within the target window 1265. Later, the relative movement of the assemblies is stopped 1270.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to data handling devices, other applications involving position monitoring can readily benefit from these teachings without departing from the scope and spirit of the present invention.

Moreover, it will be appreciated by those in the art that the selection of a suitable combination of calibration memory size, accuracy, and formula complexity is a trade-off. The best solution will depend on the application, and no particular solution to this trade-off is of critical importance to the present invention. Moreover a selection of formulae will typically be available and readily derived, depending on the applicable geometry. One of ordinary skill will be able to use the above description to make and use a variety of table-based or formula-based or other embodiments in light of the teachings above, without undue experimentation. In addition, it will be appreciated by those skilled in the art that the arrangements disclosed can be used on position monitoring systems in any application that requires the use of a supplemental sensor that may be inactive at times.

What is claimed is:

1. A method comprising steps of:
   (a) sensing with a reference sensor a reference position in a reference frame that is moving along a predetermined path relative to the reference sensor;
   (b) deriving from the reference position of the sensing step (a) a position-dependent indicator of a position-dependent longitudinal offset component along the predetermined path; and
   (c) monitoring an output from a target sensor using a target window partially based on the position-dependent indicator from the deriving step (b).

2. The method of claim 1 in which the reference position sensed in the sensing step (a) is vector-valued.

3. The method of claim 1 in which the sensing step (a) includes a step (a1) of expressing the reference position as a scalar, generally lateral position.

4. The method of claim 1 in which the sensing step (a) includes a step (a1) of expressing the reference position as a scalar, generally longitudinal position.

5. The method of claim 1, further comprising prior steps of:
   (x) marking the reference position on a first disc;
   (y) marking the target position on a second disc; and
   (z) after the marking steps (x) and (y), assembling the first and second marked discs into a co-rotatable stack so that the marked reference and target positions are mutually offset by at least 0.0000001 degree.

6. The method of claim 1, further comprising prior steps of:
   (x) marking the reference position on a first disc;
   (y) marking the target position on a second disc; and
   (z) assembling the first and second marked discs into a coaxial stack so that the marked reference and target positions are mutually offset by at least 10 degrees.

7. The method of claim 1 in which the deriving step (b) and the monitoring step (c) are performed without ever calculating an estimated size of the longitudinal offset.

8. The method of claim 1 in which the monitoring step (c) includes a step (c1) of generating an indication of whether an item detected by the target sensor is authentic.

9. The method of claim 1 in which the step of deriving (b) includes a step (b1) of computing the position-dependent indicator partially based on a lateral coordinate of the reference position.

10. The method of claim 1 in which the step of deriving (b) includes a step (b1) of computing the position-dependent indicator partially based on a longitudinal coordinate of the reference position.

11. A method comprising a step (a) of monitoring an output from a first sensor using a target window partially based on a first position-dependent indicator of a first longitudinal offset component, the indicator generated using a second sensor.

12. The method of claim 11 in which the monitoring step (a) includes a step (a1) of assembling the first and second sensors into a first assembly.

13. The method of claim 12 in which the monitoring step (a) further includes a step (a2) of assembling first and second rigid elements into a second assembly positioned so that the first sensor can sense the first rigid element and so that the second sensor can sense the second rigid element.

14. The method of claim 13 in which the monitoring step (a) further includes a step (a3) of starting the first assembly moving in a predetermined direction aligned with the offset component, relative to the second assembly.

15. The method of claim 11 in which the monitoring step (a) includes steps of:
   (a1) assembling the first and second sensors into a first assembly;
   (a2) assembling first and second rigid elements into a second assembly;

(a3) starting the first assembly moving in a predetermined direction aligned with the offset component, relative to the second assembly;

(a4) positioning the first assembly so that the first sensor can sense the first element and so that the second sensor can sense the second element;

(a5) detecting a reference position on the second element of the second assembly with the second sensor;

(a6) generating the position-dependent indicator partially based on the detected reference position and so that the longitudinal offset component is aligned in the predetermined direction; and (a7) determining the target window partially based on the position-dependent indicator.

16. The method of claim 11 in which the monitoring step (a) includes a step (a1) of deriving an expected reference position that is not used in monitoring the output from the target sensor.

17. The method of claim 11, further comprising a step (b) of generating an indication whether the first sensor's output includes an expected pattern within the target window.

18. The method of claim 11 in which the monitoring step (a) includes a step (a1) of deriving the position-dependent offset indicator by accessing a first table value based on an identifier of the first sensor and by accessing a second table value based on an identifier of the second sensor.

19. The method of claim 11 in which the monitoring step (a) includes a step (a1) of determining the target window also partially based on a second position-dependent indicator of a second longitudinal offset component.

20. The method of claim 11 in which the monitoring step (a) includes a step (a1) of identifying the first longitudinal offset component as a sensor-to-sensor offset between the first and second sensors.

21. The method of claim 11 in which the monitoring step (a) includes a step (a1) of identifying the first longitudinal offset component as a target-to-reference offset between a target position detectable by the first sensor and a reference position detectable by the second sensor.

22. The method of claim 11 in which the monitoring step (a) includes steps of:

(a1) determining a position-independent physical-to-virtual sector offset for each of the first and second sensors, exactly one of the physical-to-virtual sector offsets being zero; and (a2) determining whether the output includes an expected pattern that is partially based on the non-zero physical-to-virtual sector offset.

23. An apparatus comprising:

a reference sensor constructed and arranged to sense a reference position in a reference frame that can move along a predetermined path relative to the reference sensor;

a target sensor having an output; and a processor constructed and arranged to compute a position-dependent indicator of a position-dependent longitudinal offset component along the predetermined path so that the indicator is partially based on the sensed reference position, the processor also able to monitor the output using a target window partially based on the position-dependent indicator.

24. The apparatus of claim 23, the apparatus being a data handling system and the reference and target sensors being selectively positionable transducer heads configured to access respective data storage discs.

25. The apparatus of claim 23 comprising an actuator that supports the reference sensor and the target sensor.

26. The apparatus of claim 23, further comprising a rigid device having a multiplicity of markings, the markings including the reference position and a target position detectable by the target sensor.

27. The apparatus of claim 26 in which the target position is not detectable by the reference sensor.

28. The apparatus of claim 23 in which the reference frame is stationary relative to at least first and second rotatable disc surfaces each having several servo marks, each of the servo marks having a physical identifier stored therein and a virtual identifier usable by the processor for accessing the mark.

29. The apparatus of claim 23 in which the reference frame is stationary relative to at least first and second rotatable disc surfaces each having several servo marks, each servo mark having one physical identifier stored in the mark and one virtual identifier usable for accessing the mark, only some of the servo marks each identified so that its virtual identifier equals its physical identifier.

* * * * *